United States Patent
Badami et al.

(10) Patent No.: US 6,629,142 B1
(45) Date of Patent: Sep. 30, 2003

(54) MECHANISM FOR OPTIMIZING PROCESSING OF CLIENT REQUESTS

(75) Inventors: Vinay S. Badami, Sunnyvale, CA (US); Howard Palmer, Santa Cruz, CA (US)

(73) Assignee: Sun Microsystems, Inc., Palo Alto, CA (US)

( * ) Notice: Subject to any disclaimer, the term of this patent is extended or adjusted under 35 U.S.C. 154(b) by 633 days.

(21) Appl. No.: 09/602,642

(22) Filed: Jun. 22, 2000

Related U.S. Application Data

(60) Provisional application No. 60/156,305, filed on Sep. 24, 1999, and provisional application No. 60/155,711, filed on Sep. 24, 1999.

(51) Int. Cl.$^7$ ............................................. G06F 15/173
(52) U.S. Cl. ...................... 709/225; 709/226; 709/104
(58) Field of Search .................................. 709/200, 201, 709/203, 217, 218, 219, 223, 224, 225, 226, 104

(56) References Cited

U.S. PATENT DOCUMENTS

| | | | | |
|---|---|---|---|---|
| 5,410,698 A | | 4/1995 | Danneels et al. ............ 395/650 |
| 5,586,312 A | * | 12/1996 | Johnson et al. ............. 395/610 |
| 5,691,973 A | | 11/1997 | Ramstrom et al. .......... 370/58.2 |
| 5,790,790 A | | 8/1998 | Smith et al. ................. 709/236 |
| 5,793,415 A | | 8/1998 | Gregory, III et al. .......... 348/15 |
| 5,796,393 A | | 8/1998 | MacNaughton et al. .... 345/329 |
| 5,809,145 A | | 9/1998 | Slik et al. ...................... 380/25 |
| 5,809,248 A | | 9/1998 | Vidovic ....................... 709/249 |
| 5,835,724 A | | 11/1998 | Smith ..................... 395/200.57 |
| 5,872,963 A | | 2/1999 | Bitar et al. ................... 395/580 |
| 5,918,228 A | | 6/1999 | Rich et al. .................... 707/10 |
| 5,928,323 A | | 7/1999 | Gosling et al. .............. 709/203 |
| 5,961,584 A | | 10/1999 | Wolf ............................ 709/103 |
| 5,991,792 A | | 11/1999 | Nageswaran ................ 709/102 |
| 6,012,090 A | | 1/2000 | Chung et al. ................ 709/219 |
| 6,052,711 A | | 4/2000 | Gish ............................ 709/203 |
| 6,112,196 A | | 8/2000 | Zimowski et al. |
| 6,141,684 A | * | 10/2000 | McDonald et al. ......... 709/222 |
| 6,182,109 B1 | | 1/2001 | Sharma et al. .............. 709/104 |
| 6,266,661 B1 | * | 7/2001 | Lewish et al. .................. 707/3 |
| 6,304,967 B1 | * | 10/2001 | Braddy ........................ 713/150 |
| 6,317,742 B1 | * | 11/2001 | Nagaratnam et al. .......... 707/9 |
| 6,374,286 B1 | | 4/2002 | Gee et al. .................... 709/108 |
| 6,393,477 B1 | | 5/2002 | Paxhia et al. ................ 709/223 |
| 6,418,458 B1 | | 7/2002 | Maresco ...................... 709/103 |

OTHER PUBLICATIONS

Sebastian Wilhelmi, "Re: (ORBit–mt–0.5.7)g_main_iterate(): main loop already active in another thread," Jan. 28, 2002, http://mail.gnome.org/archives/orbit–list/2002–Jan./msg00152.hmtl, printed Oct. 21, 2002, 2 pages.

Sumedh Mungee, "Online CORBA documents," http://www.cs.wustl.edu/~schmidt/CORBA–docs/, printed Oct. 21, 2002, 3 pages.

"System for Dispatching from Multiple Thread Pools", Jan. 1, 1998, IBM Technical Disclosure Bulletin, vol. 41, issue No. 1, pp. 329–332.

* cited by examiner

*Primary Examiner*—Moustafa M. Meky
(74) *Attorney, Agent, or Firm*—Bobby K. Truong; Hickman Palermo Truong & Becker LLP

(57) ABSTRACT

An improved mechanism for processing client requests is disclosed. The first time a client request for a particular resource is received by a server, it is processed by stepping through a configuration file, and selectively executing directives specified in the configuration file. As the request is processed, a list of executed directives is compiled. This list of directives is stored for future reference. The next time a request for that same resource is received, the configuration file is not consulted. Instead, the stored list of directives is accessed and used to process the request. More specifically, all of the directives on the list are executed to process the request. Processing the subsequent request in this way eliminates much of the overhead associated with request processing. There is no need to open or to step through the configuration file, and there is no need to step through the directives themselves. By removing this overhead for all requests for a resource after the first, request processing efficiency is significantly improved.

24 Claims, 6 Drawing Sheets

Configuration File

AT  Function 1

AT  Function 2

⋮

NT  Function 3     Condition 3     Parameters 3

NT  Function 4     Condition 4     Parameters 4

⋮

PC  Function 5

PC  Function 6

⋮

OT  Function 7                     Parameters 7

OT  Function 8                     Parameters 8

⋮

SE  Function 9     Condition 9     Parameters 9

SE  Function 10    Condition 10    Parameters 10

⋮

LO Function 11

LO Function 12

⋮

ER Function 13

ER Function 14

DIRECTIVE LIST

MECHANISM FOR OPTIMIZING PROCESSING OF CLIENT REQUESTS

This application claims the benefit of U. S. Provisional Application entitled "Web Server Architecture", No. 60/156,305, filed Sep. 24, 1999, and U.S. Provisional Application entitled "Web Server Architecture", No. 60/155,711, filed Sep. 24, 1999. The entire contents of these prior applications are hereby incorporated by reference.

BACKGROUND

This invention relates generally to computer systems, and more particularly to a mechanism for optimizing processing of client requests.

On the Internet or World Wide Web, information is generally communicated on a request-response basis. That is, a client (typically running a browser program) submits a request to a server for a particular resource. In response, the server performs whatever tasks are necessary to service the request (e.g. access and execute the resource), and then provides one or more sets of content back to the client. The client thereafter renders the content to a user. This request-response sequence, referred to as a "roundtrip", is carried out for each request.

In processing a client request, the server proceeds through a number of different phases. The particular phases implemented by the server may differ from server to server, but some common phases include the authorization translation (AT) phase, the name translation (NT) phase, the path check (PC) phase, the object-typing (OT) phase, the service (SE) phase, the logging phase (LO), and the error (ER) phase.

In the AT phase, the server determines whether the particular client submitting the request is authorized to access the server. Unless this determination is answered in the affirmative, no further processing of the request is performed (except for error processing). In the NT phase, the server translates the logical universal resource locator (URL) of the request into a physical pathname on the server's file system. For example, the http://server name/ part of the request may be translated into a directory pathname, such as D:/Server/docs. This translation makes it possible to actually access a resource on the server. In the PC phase, the server checks the pathname derived in the NT phase to determine whether the particular client submitting the request is authorized to access the specific resource specified in the pathname. It is possible for a client to have authorization to access the server generally but not to have authorization to access a particular resource on the server. The PC phase checks for this possibility. Unless it is determined that the client is authorized to access the requested resource, the client request will not be serviced.

In the OT phase, the server determines the MIME (Multipurpose Internet Mail Extensions) type of the request. The MIME type has three attributes: type, encoding, and language. These attributes affect the manner in which the server processes the request, and the form in which the response will be provided to the client. In the SE phase, the server actually services the request. In doing so, the server may invoke one or more service subsystems provided by the server to provide the resource requested by the client. The type attribute determined during the OT phase may be used in determining which service subsystem to invoke. At the end of the SE phase, a response is sent back to the client. In the LO phase, the server adds entries to a set of log files. These log entries document the processing of the request. Finally, in the ER phase, the server processes any errors that occurred during the processing of the request. The ER phase is implemented only if one or more errors occurred in one of the preceding phases.

In processing a request, the server executes one or more directives in each of the phases. As used herein, the term directive refers broadly to any instruction or command that is recognized by the server and that causes the server to take some action. These directives in turn cause one or more functions to be invoked/performed. Together, the functions of the various phases operate to process the request and to generate a response to the client. In proceeding through the various phases, the server typically uses a configuration file as a guide. The configuration file contains, for each phase, all of the directives that may be executed in that phase. The server steps through these directives, phase by phase, directive by directive, and selectively executes certain directives to process the request. The particular directives executed by the server may, and mostly likely will, vary from request to request, depending upon the request.

With reference to FIG. 1, there is shown a pictorial representation of a sample configuration file 100 used in processing a request. As shown, the configuration file 100 comprises a plurality of entries, with each entry representing a directive. Each directive specifies a phase and a function. The phase (e.g. AT, NT, etc.) indicates the phase to which the directive pertains, and the function is the function that is invoked when the directive is executed. In addition, a directive may optionally further specify a condition and a set of parameters. The condition specifies the condition that needs to be met before the directive is executed, and the parameters provide the parameters that will be used when the function is invoked. As shown in FIG. 1, each phase may comprise a plurality of directives. Depending upon the phase, all of the directives pertaining to that phase may be executed, some of the directives may be executed, or just one directive may be executed. Which directives are executed, and how many, are controlled by the server.

As noted above, the server steps through the directives, phase by phase, directive by directive, to process a request. To illustrate how this is done, a sample processing of a request will now be described. In processing a request for a particular resource, the server begins with the AT phase. In this phase, all of the pertinent directives are executed to ensure that all authorization conditions are tested. Thus, the server executes each of the AT directives in the configuration file 100. These directives are executed one after the other in the order set out in the configuration file 100. As each directive is executed, a corresponding function is invoked. If any error is encountered during the execution of any of the functions (thereby meaning that the client is not authorized to access the server), then all further processing of the request is halted, and the ER phase is entered. The directives in the ER phase are then executed to generate errors messages that are returned to the client. If no errors are encountered, then the AT phase will complete successfully, and the server will proceed to the NT phase.

In the NT phase, the server executes only one directive. Once an NT directive is executed, the server moves on to the PC phase. In determining which NT directive to execute, the server steps through each NT directive (beginning with the first) and determines whether the condition(s) for that directive is satisfied by the current request. If the condition(s) is not met, thereby meaning that the directive does not apply to the current request, then the server proceeds to the next NT directive and repeats the same process. This continues until an applicable NT directive is found and executed. Unless there is an error in the configuration file, an applicable NT directive will be found and executed for every request. Since only the first applicable NT directive is executed, the ordering of the NT directives in the configuration file 100 is important. Once an NT directive is executed, thereby causing a corresponding function to be invoked, the server exits the NT phase and proceeds to the PC phase.

As with the AT phase, all of the directives in the PC phase are executed to ensure that the client has full authorization to access the requested resource. If any error is encountered during the execution of any of the PC directives (thereby meaning that the client is not authorized to access the requested resource), then all further processing of the request is halted, and the ER phase is entered. The directives in the ER phase are then executed to generate errors messages that are returned to the client. On the other hand, if no errors are encountered, then all of the PC directives are executed to complete the PC phase. Once the PC phase is completed, the server proceeds to the OT phase. As with the PC phase, all of the directives in the OT phase are executed. Once all of these directives are executed, the server proceeds to the SE phase.

In the SE phase, the request is actually serviced. More specifically, the requested resource is access and processed, and a response is provided to the client. In servicing the request, the server executes just one of the SE directives. To determine which SE directive to execute, the server steps through each directive (beginning with the first) and determines whether the condition(s) for that directive is satisfied by the current request. For example, if the current request is for a cgi resource, the server determines whether the directive applies to cgi resources. If an SE directive does not apply to the current request, then the server proceeds to the next SE directive and repeats the same process. This continues until an applicable SE directive is found and executed. Unless there is an error in the configuration file 100, an applicable SE directive will be found and executed for every request. Once an SE directive is executed, thereby causing a corresponding function to be invoked, the request is serviced. Thereafter, the server sends a response to the client, exits the SE phase, and proceeds to the LO phase. In the LO phase, all of the LO directives are executed to log the processing of the request into the server. Once that is done, processing of the request is completed. This overall process is repeated for each and every request.

As the above discussion shows, a significant amount of processing is performed to process each request. Some of this processing, for example, the execution of the directives, is necessary. However, some of the processing is just overhead for enabling the proper directives to be executed. Examples of this overhead include the searching for the applicable NT and SE directives, and the processing of the configuration file 100. For a small number of directives and a small number of requests, this overhead is fairly negligible. However, with many directives and many requests (as is usually the case with large complex systems), the overhead can become significant. In fact, it can become so significant that it degrades system performance. Since performance degradation is clearly an undesirable result, it is desirable to minimize this overhead as much as possible. Currently, however, there is no effective mechanism for doing so.

SUMMARY OF THE INVENTION

To overcome the shortcomings of the prior art, the present invention provides an improved mechanism for processing client requests. According to the present invention, the first time a client request for a particular resource is received by a server, it is processed using the configuration file as described above. As the request is processed, a list of executed directives is compiled. This list of directives represents just the directives that were actually executed during processing, and does not include the directives which were determined not to apply to the request. In effect, the list represents a trace of the processing of the request. Once the list of directives is compiled, it is stored for future reference. The next time a request for that same resource is received, the configuration file is not consulted. Instead, the stored list of directives is accessed and used to process the request. More specifically, all of the directives on the list are executed in turn to process the request. Since these are the same directives as those executed in the processing of the prior request, the subsequent request will be processed properly.

Note that the processing of the subsequent request is carried out much more efficiently than the first. Unlike the first request, there is no need to open or to step through the configuration file. There is also no need to step through the directives themselves to determine which directives apply to the request. The applicable directives have already been determined. All that needs to be done is to execute them. By processing all requests after the first in this manner, most of the request processing overhead is eliminated. By removing unnecessary overhead, the present invention significantly increases the efficiency of the request processing process. Hence, the present invention represents a significant improvement over the prior art.

BRIEF DESCRIPTION OF THE DRAWINGS

FIG. 1 is a pictorial representation of a sample configuration file which may be used in processing client requests.

DETAILED DESCRIPTION OF EMBODIMENT(S)

Figure 2:
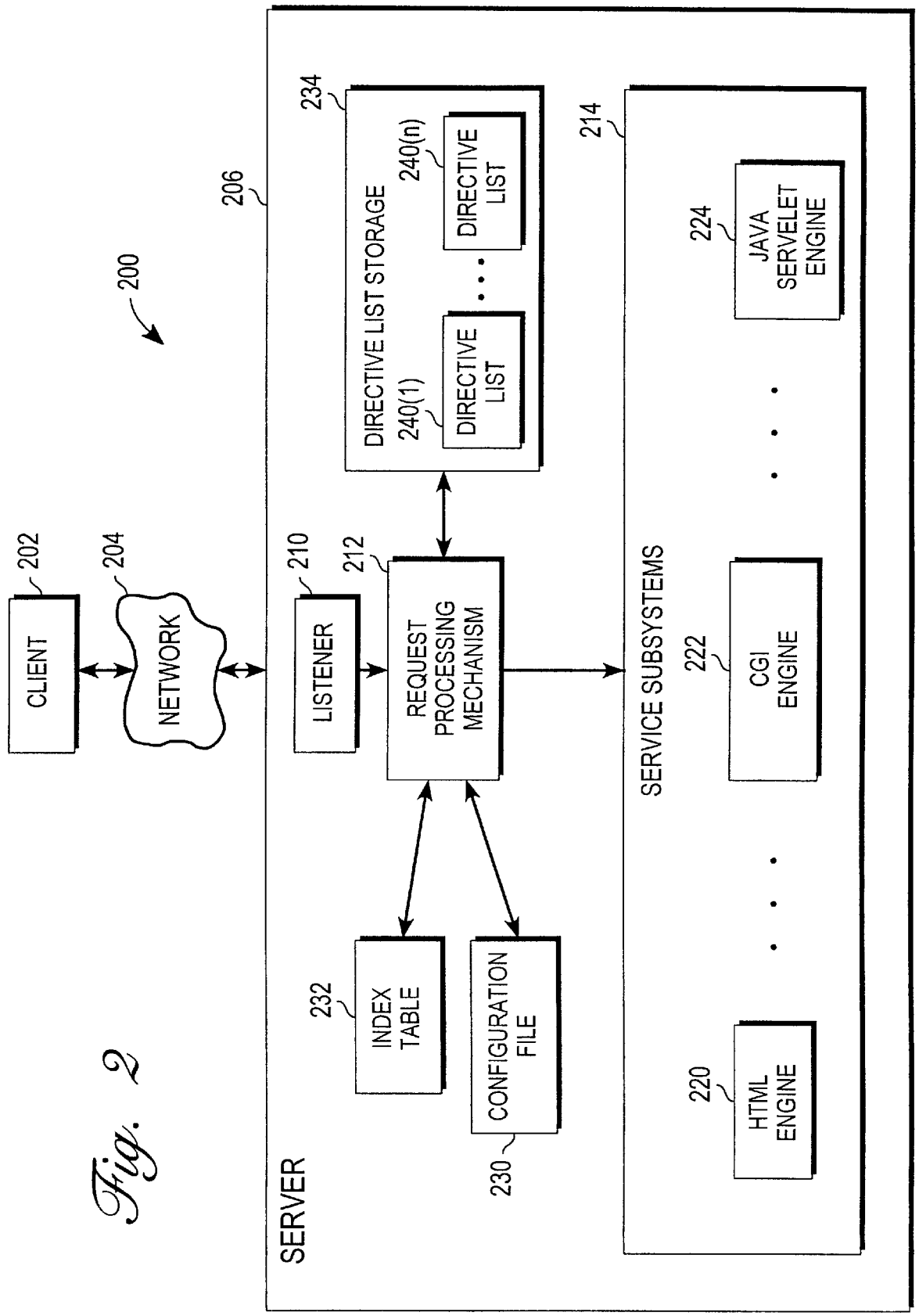
FIG. 2 is a functional block diagram of a system in which one embodiment of the present invention may be implemented.

With reference to FIG. 2, there is shown a functional block diagram of a system 200 in which one embodiment of the present invention may be implemented, the system comprising a client 202, a network 204, and a server 206. For the sake of simplicity, only one client 202 is shown; however, it should be noted that multiple clients 202 may be coupled to, and communicate with, the server 206 via the network 204. For purposes of the present invention, the client 202 may be any mechanism capable of communicating with the server 206, including but not limited to a computer running a browser program. The client 202 may communicate with the server 206 using any known protocol, including but not limited to HTTP and FTP.

The network 204 may be any type of network, including but not limited to a local area network and a wide area network such as the Internet. The network 204 may even be as simple as a direct connection. Any mechanism capable of facilitating communication between the client 202 and the server 206 may serve as the network 204.

The server 206 is the component responsible for providing most of the functionality in the system 200. More specifically, the server 206 receives requests from the client 202 for specific resources, and responds to the requests by providing content. This content may be derived by accessing static files, processing server-parsed entities, or by executing one or more applications. What actions need to be carried out by the server 206 to derive the content is typically determined by the resource specified in the request.

In one embodiment, the server 206 comprises a listener 210, a request processing mechanism 212, and a set of service subsystems 214. The primary function of the listener 210 is to receive a client request, parse the request into its various components (e.g. method, headers, universal resource identifier (URI), parameters, etc.), and store the various components into predefined structures. Once the request is parsed, it is ready for processing by the request processing mechanism 212.

In processing a request, the request processing mechanism 212 proceeds through a plurality of phases. In one embodiment, these phases comprise the phases previously discussed, including the AT phase, the NT phase, the PC phase, the OT phase, the SE phase, the LO phase, and possibly the ER phase. In each phase, one or more directives are executed, which in turn, causes one or more functions to be invoked. Together, the various functions perform all of the actions necessary for processing the request.

In servicing the request, the request processing mechanism 212 may invoke one of the service subsystems 214 provided by the server 206. These subsystems may include, for example, an HTML engine 220, a CGI engine 222, and a JAVA servelet engine 224, among others. Which subsystem 220, 222, 224 is invoked is determined by the resource being requested. For example, if the requested resource is a CGI application, then the CGI engine 222 will be invoked. On the other hand, if the requested resource is a JAVA servelet, then the servelet engine 224 will be invoked. Which subsystem is invoked is determined and controlled by the request processing mechanism 212. Overall, the request processing mechanism 212 controls the processing of the request.

In one embodiment, it is the request processing mechanism 212 that implements the methodology of the present invention. More specifically, when a request for a resource is received, the processing mechanism 212 first determines whether a directive list has already been created for that resource. If not, then the processing mechanism 212 processes the request using-a configuration file such as that shown in FIG. 1, in much the same manner as was previously described. As the request is processed through the various phases using the configuration file, a list of the executed directives is compiled. This list of directives represents just the directives that were actually executed during processing, and does not include the directives which were determined not to apply to the request. In effect, the list represents a trace of the processing of the request. Once the directive list is compiled, it is stored for future reference. That directive list will be used to process the next request for that same resource.

Processing a request using the configuration file is performed only if a directive list does not already exist for a requested resource. If a directive list already does exist, then the configuration file is not consulted or processed at all. Instead, the directive list associated with the requested resource is accessed and used to process the request. More specifically, all of the directives referenced in the directive list are executed one after the other. Since the directive list,was previously created by the processing mechanism 212, and since the directive list contains only those directives that apply to the requested resource, processing the request using the directive list will lead to efficient and correct results.

Notice that the processing of all requests for a resource after the first request is carried out quite efficiently. Unlike the first request, there is no need in subsequent requests to open or to step through the configuration file. There is also no need to step through the directives themselves to determine which directives apply to the request. The applicable directives have already been determined and stored in the directive list. All that needs to be done is to execute them. By processing all requests after the first in this manner, most of the request processing overhead is eliminated. By removing unnecessary overhead, the present invention significantly increases the efficiency of the request processing process.

In carrying out the methodology of the present invention, the request processing mechanism 212 accesses and manipulates a plurality of informational structures, including a configuration file 230, an index table 232, and a directive list storage 234 comprising a plurality of directive lists 240. In one embodiment, the configuration file 230 takes a form substantially similar to that shown in FIG. 1, wherein the file 230 comprises a plurality of entries, with each entry representing a particular directive pertaining to a particular phase. By stepping through the configuration file 230, phase by phase, directive by directive, the processing mechanism 212 can process any request received from any client for any resource.

Figure 3:
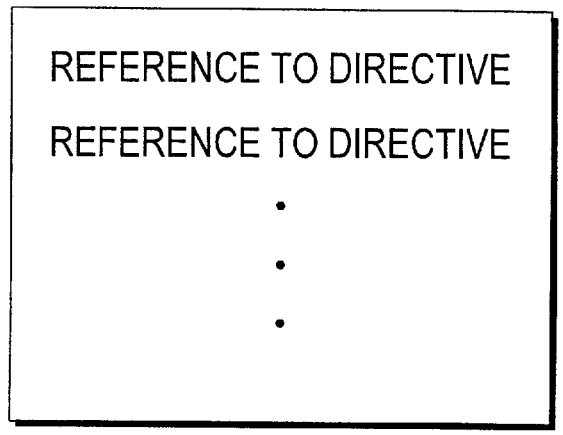
FIG. 3 is a pictorial representation of a sample directive list in accordance with one embodiment of the present invention.

To prevent having to access and to step through the configuration file 230 each time a request is processed, the processing mechanism 212 maintains and uses the directive lists 240 and the index table 232. The directive lists 240 provide efficient alternatives to the configuration file 230, and the index table 232 facilitates access to the directive lists 240. As shown in FIG. 3, a directive list 240 comprises a list of references to directives. For purposes of the present invention, the directive list 240 may take on any desired form, but in one embodiment, the references take the form of pointers to directives, and the directive list 240 takes the form of an array of these pointers. The directives referred to in a directive list 240 are those that need to be executed in order to process a request for a particular resource. Since these directives are specific to a particular resource, each directive list 240 is associated with a corresponding resource.

Figure 4:
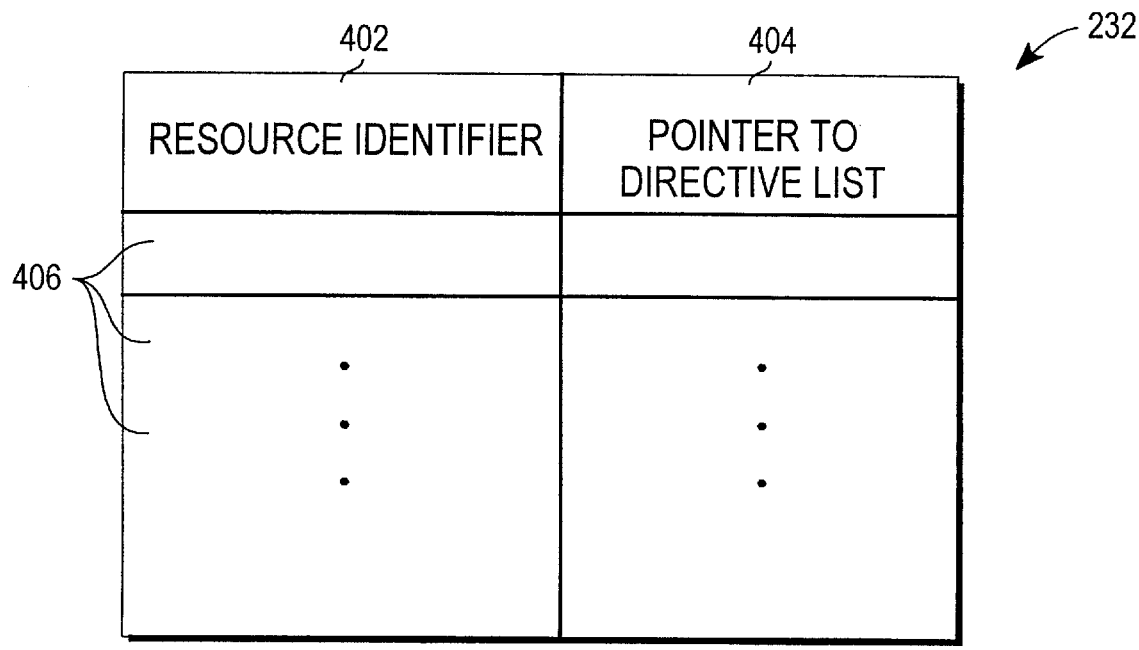
FIG. 4 is a pictorial representation of a sample index table in accordance with one embodiment of the present invention.

The association between a specific resource and a directive list 240 is maintained in the index table 232, as shown in the sample index table 232 of FIG. 4. In one embodiment, the table comprises two columns: (1) a resource identifier column 402; and (2) a pointer to directive list column 404. For each entry 406 in the table 232, there is stored in column 402 the identifier for a particular resource. This identifier may comprise the URI associated with the resource. In addition, it may further include other sets of information, such as host ID, port ID, and IP address. For purposes of the present invention, any sets of information may be used to uniquely identify a resource. In the pointer column 404 of that same entry 406, there is stored a pointer to the directive list 240 associated with that particular resource. With these two sets of information, the processing mechanism 212 can quickly and easily determine whether there is an existing directive list 240 associated with a resource, and if so, how to access that directive list 240. The use of the index table 232 and the directive lists 240 will be elaborated upon in a later section.

Figure 5A:
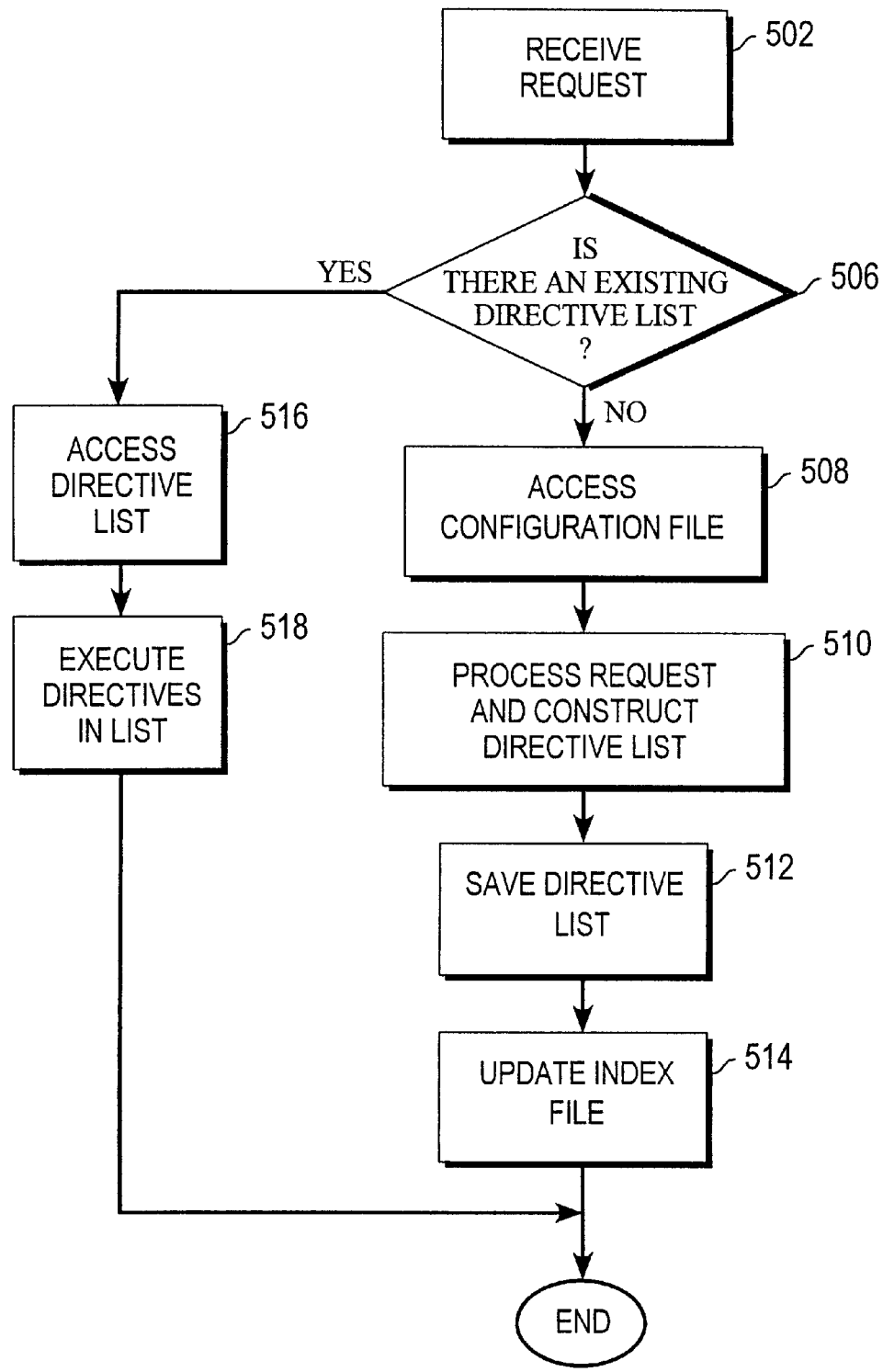
FIGS. 5a and 5b are flow diagrams illustrating the operational flow of one embodiment of the request processing mechanism of FIG. 2.
Figure 5B:
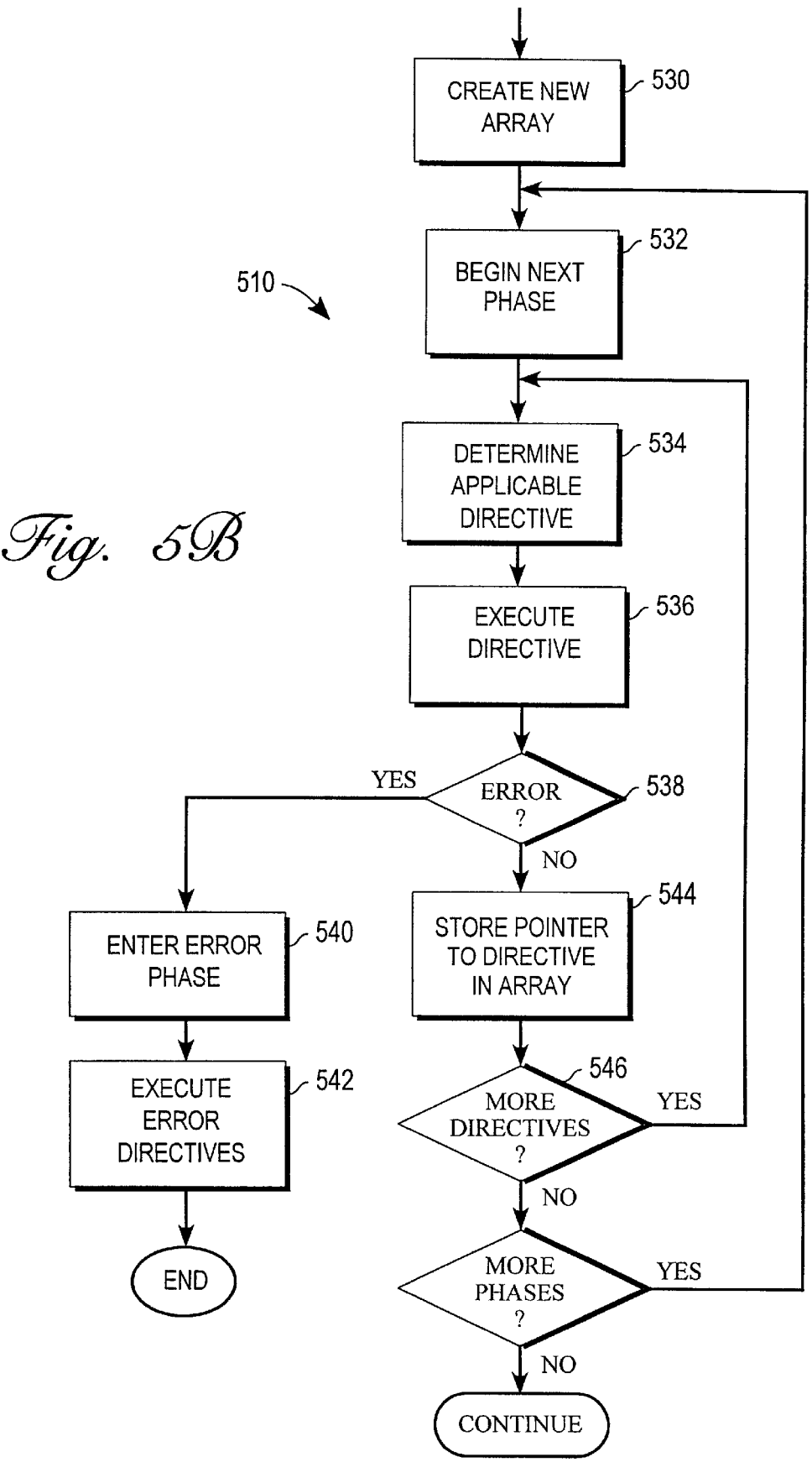

The structure of the server 206 has been disclosed. With reference to the flow diagrams of FIGS. 5*a* and 5*b*, the operation of the request processing mechanism 212 will now be described. When a request for a particular resource is received by the server 206, the request is first parsed by the listener 210 into a plurality of fundamental components, including a method, headers, a URI for the requested resource, and a set of parameters. Once parsed, the request is passed on to the request processing mechanism 212 for processing.

Upon receiving (502) the request, the request processing mechanism 212 determines (506) whether a directive list 240 already exists for the requested resource. If so, then that directive list 240 is used to process the request. If not, then the general configuration file 230 will need to be accessed and processed. In one embodiment, this determination (506) is made by consulting the index table 232. More specifically, the processing mechanism 212 compares the identifier associated with the requested resource (which may comprise the URI of the resource as well as other sets of information) with the values stored in the resource identifier column 402 of the index table 232 (FIG. 4). If a match is found, then it means that an associated directive list already exists for the requested resource, and hence, can be used to process the request. On the other hand, if no match is found, then it means that no associated directive list has yet been created for the requested resource. For the sake of example, it will be assumed that no match is found in the index table 232. In such a case, the processing mechanism 212 proceeds to (508) to access the general configuration file 230. Once accessed, the configuration file 230 is used to process (510) the request and to construct a directive list for the requested resource. Operation (510) is shown in greater detail in FIG. 5*b*.

Initially, an array is created (530). This array (which will eventually serve as the directive list for the requested resource) is used to hold pointers to the directives that are executed as the request is processed. Once the array is created, the request processing mechanism 212 processes the request by proceeding (532) to the next phase. In this phase, the processing mechanism 212 steps through the pertinent directives in the configuration file 230, beginning with the first, and determines (534) for each directive reached whether that directive applies to the current request. For some phases, such as the AT phase and the PC phase, all directives apply; thus, this determination is automatically affirmative. For other phases, though, such as the NT phase and the SE phase, only selected directives apply. In such phases, the processing mechanism 212 tests the condition(s) specified in a directive to determine whether that directive applies to the current request. When a directive is determined to be applicable, it is executed (536) by the processing mechanism 212.

After executing the directive, the processing mechanism 212 determines (538) whether an, error arose as a result of executing the directive. If so, then the processing mechanism 212 skips the rest of the phases and enters (540) the ER phase. In the ER phase, the processing mechanism 212 executes (542) the applicable directives to process the error. Once that is done, processing of the request is terminated.

Returning to (538), if it is determined that no error occurred, then the processing mechanism 212 proceeds to (544) to store a pointer to the directive that was just executed into the array. This serves to add the directive to the directive list. Once that is done, the processing mechanism 212 determines (546) whether there are any more directives to be executed in this phase. In some phases such as the AT phase and the PC phase, multiple directives may be executed. If there are more directives to be executed in this phase, the processing mechanism 212 loops back to (534) to find and possibly execute another applicable directive. This continues until there are no more applicable directives to execute, at which point, the processing mechanism 212 proceeds to (548) to determine whether there are any more phases to implement. If so, the processing mechanism 212 loops back to (532) to start the next phase, and to repeat the process described above. This continues until the processing mechanism 212 has proceeded through all of the phases. Once that is the case, processing of the request is completed. By the end of the process, the array will contain a pointer to all of the directives that were executed during the processing of the request. The array can now be used as the directive list for the requested resource.

Returning to FIG. 5*a*, after the request has been processed and the array (i.e. the directive list) has been created, the processing mechanism 212 saves (512) the newly created array into the directive list storage 234 as one of the directive lists 240. In addition, the processing mechanism 212 updates (514) the index table 232 to reflect the newly created directive list 240. More specifically, a new entry is inserted into the index table 232. In column 402 of the new entry, the resource identifier of the requested resource is stored. In column 404 of that same entry, a pointer to the newly created directive list 240 is stored. That way, the next time the same resource is specified in a request, the directive list 240 can be easily accessed and used to process the request. There will be no need to consult or to process the configuration file 230. Once the index table 232 is updated, processing of the request is terminated.

Thus far, the operation of the processing mechanism 212 has been described assuming that a directive list does not already exist for the requested resource. Returning to (506) of FIG. 5*a*, if it is determined in (506) that a directive list 240 already does exist for the requested resource (i.e. a matching resource identifier is found in an entry of the index table 232), then the processing mechanism 212 accesses (516) that directive list 240. The directive list 240 is accessed by following the directive list pointer in the matching entry. Once the directive list 240 is accessed, the processing mechanism 212 executes (518) all of the directives referenced in the directive list 240 one after the other, beginning with the first. Since the directive list 240 contains references to all of the directives that need to be executed to process requests for the requested resource, executing all of these directives will ensure that the request is properly processed. Thus, the request is processed without consulting the configuration file 230. Processing the request in this manner significantly reduces processing overhead, thereby increasing system efficiency.

Hardware Overview

Figure 6:
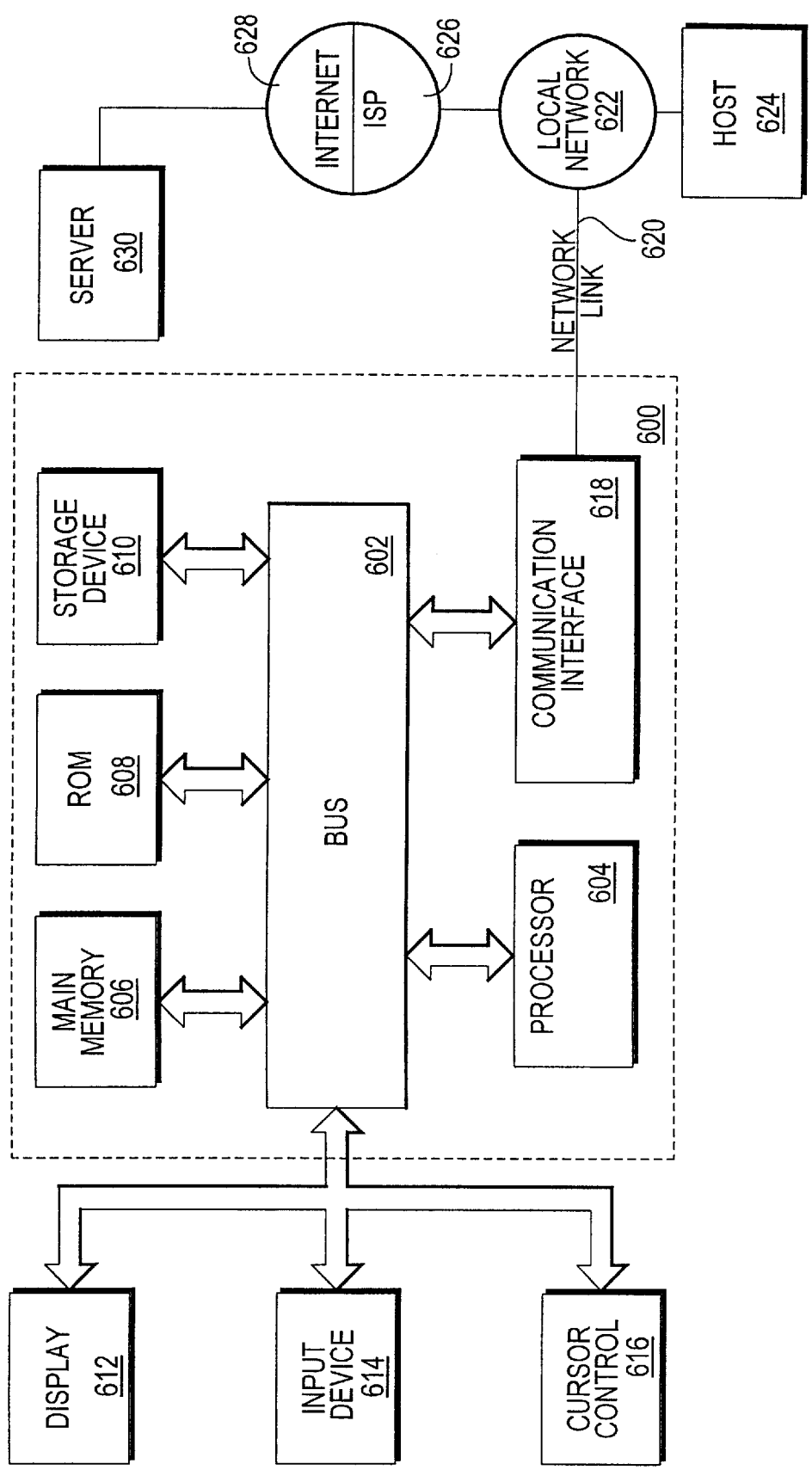
FIG. 6 is a hardware block diagram of a computer system in which one embodiment of the present invention may be implemented.

In one embodiment, the server 206 of the present invention is implemented as a set of instructions executable by one or more processors. The invention may be implemented as part of an object oriented programming system, including but not limited to the Java™ programming system manufactured by Sun Microsystems, Inc. of Mountain View, Calif. FIG. 6 shows a hardware block diagram of a computer system 600 in which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory (RAM) or other dynamic storage device, coupled to bus 602 for storing information and instructions to be executed by processor 604. Main memory 606 may also be further used to store temporary variables or other intermediate information during execution of instructions by processor 604. Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

According to one embodiment, the functionality of the present invention is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or electromagnetic waves, such as those generated during radio-wave, infra-red, and optical data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. The received code may be executed by processor 604 as it is received, and/or stored in storage device 610, or other non-volatile storage for later execution. In this manner, computer system 600 may obtain application code in the form of a carrier wave.

At this point, it should be noted that although the invention has been described with reference to a specific embodiment, it should not be construed to be so limited. Various modifications may be made by those of ordinary skill in the art with the benefit of this disclosure without departing from the spirit of the invention. Thus, the invention should not be limited by the specific embodiments used to illustrate it but only by the scope of the appended claims.

What is claimed is:

1. A computer implemented method for processing a request, comprising:
   receiving a request for a particular resource;
   determining whether said particular resource has a directive list associated therewith, wherein said directive list comprises references to applicable directives which need to be executed to process requests for said particular resource;

in response to a determination that said particular resource has a directive list associated therewith, accessing said directive list; and executing all of said applicable directives referenced in said directive list to process said request for said particular resource.

2. The method of claim 1, wherein said references to said applicable directives comprise pointers to said applicable directives, and wherein said directive list is an array of said pointers.

3. The method of claim 1, wherein said request is processed without processing a general configuration file which contains references to substantially all directives that can be executed.

4. The method of claim 1, further comprising:

receiving a second request, said second request requesting a second particular resource;

determining whether said second particular resource has a second directive list associated therewith, wherein said second directive list comprises references to a second set of applicable directives which need to be executed to process requests for said second particular resource;

in response to a determination that said second particular resource has a second directive list associated therewith, accessing said second directive list; and executing all of said second set of applicable directives referenced in said second directive list to process said second request for said second particular resource.

5. The method of claim 1, further comprising:

in response to a determination that said particular resource does not have a directive list associated therewith, processing said request for said particular resource;

creating a new directive list for said particular resource, said new directive list comprising references to applied directives which were executed during the processing of said request; and storing said new directive list into storage for future reference.

6. The method of claim 5, wherein said references to said applied directives comprise pointers to said applied directives, and wherein said new directive list is an array of said pointers.

7. The method of claim 5, wherein processing said request comprises:

accessing a general configuration file containing references to substantially all directives that can be executed; and executing selected directives referenced by said general configuration file to process said request.

8. The method of claim 5, further comprising:

updating an index to associate said new directive list with said particular resource.

9. An apparatus for processing a request, comprising:

a mechanism for receiving a request for a particular resource;

a mechanism for determining whether said-particular resource has a directive list associated therewith, wherein said directive list comprises references to applicable directives which need to be executed to process requests for said particular resource;

a mechanism for accessing, in response to a determination that said particular resource has a directive list associated therewith, said directive list; and a mechanism for executing all of said applicable directives referenced in said directive list to process said request for said particular resource.

10. The apparatus of claim 9, wherein said references to said applicable directives comprise pointers to said applicable directives, and wherein said directive list is an array of said pointers.

11. The apparatus of claim 9, wherein said request is processed without processing a general configuration file which contains references to substantially all directives that can be executed.

12. The apparatus of claim 9, further comprising:

a mechanism for receiving a second request, said second request requesting a second particular resource;

a mechanism for determining whether said second particular resource has a second directive list associated therewith, wherein said second directive list comprises references to a second set of applicable directives which need to be executed to process requests for said second particular resource;

a mechanism for accessing, in response to a determination that said second particular resource has a second directive list associated therewith, said second directive list; and a mechanism for executing all of said second set of applicable directives referenced in said second directive list to process said second request for said second particular resource.

13. The apparatus of claim 9, further comprising:

a mechanism for processing, in response to a determination that said particular resource does not have a directive list associated therewith, said request for said particular resource;

a mechanism for creating a new directive list for said particular resource, said new directive list comprising references to applied directives which were executed during the processing of said request; and a mechanism for storing said new directive list into storage for future reference.

14. The apparatus of claim 13, wherein said references to said applied directives comprise pointers to said applied directives, and wherein said new directive list is an array of said pointers.

15. The apparatus of claim 13, wherein the mechanism for processing said request comprises:

a mechanism for accessing a general configuration file containing references to substantially all directives that can be executed; and a mechanism for executing selected directives referenced by said general configuration file to process said request.

16. The apparatus of claim 13, further comprising:

a mechanism for updating an index to associate said new directive list with said particular resource.

17. A computer readable medium having stored thereon instructions which, when executed by one or more processors, cause the one or more processors to process a request, said computer readable medium comprising:

instructions for causing one or more processors to receive a request for a particular resource;

instructions for causing one or more processors to determine whether said particular resource has a directive list associated therewith, wherein said directive list comprises references to applicable directives which need to be executed to process requests for said particular resource;

instructions for causing one or more processors to access, in response to a determination that said particular resource has a directive list associated therewith, said directive list; and instructions for causing one or more processors to execute all of said applicable directives referenced in said directive list to process said request for said particular resource.

18. The computer readable medium of claim 17, wherein said references to said applicable directives comprise pointers to said applicable directives, and wherein said directive list is an array of said pointers.

19. The computer readable medium of claim 17, wherein said request is processed without processing a general configuration file which contains references to substantially all directives that can be executed.

20. The computer readable medium of claim 17, further comprising:

instructions for causing one or more processors to receive a second request, said second request requesting a second particular resource;

instructions for causing one or more processors to determine whether said second particular resource has a second directive list associated therewith, wherein said second directive list comprises references to a second set of applicable directives which need to be executed to process requests for said second particular resource;

instructions for causing one or more processors to access, in response to a determination that said second particular resource has a second directive list associated therewith, said second directive list; and instructions for causing one or more processors to execute all of said second set of applicable directives referenced in said second directive list to process said second request for said second particular resource.

21. The computer readable medium of claim 17, further comprising:

instructions for causing one or more processors to process, in response to a determination that said particular resource does not have a directive list associated therewith, said request for said particular resource;

instructions for causing one or more processors to create a new directive list for said particular resource, said new directive list comprising references to applied directives which were executed during the processing of said request; and instructions for causing one or more processors to store said new directive list into storage for future reference.

22. The computer readable medium of claim 21, wherein said references to said applied directives comprise pointers to said applied directives, and wherein said new directive list is an array of said pointers.

23. The computer readable medium of claim 21, wherein the instructions for causing one or more processors to process said request comprises:

instructions for causing one or more processors to access a general configuration file containing references to substantially all directives that can be executed; and instructions for causing one or more processors to execute selected directives referenced by said general configuration file to process said request.

24. The computer readable medium of claim 21, further comprising:

instructions for causing one or more processors to update an index to associate said new directive list with said particular resource.

* * * * *

UNITED STATES PATENT AND TRADEMARK OFFICE
CERTIFICATE OF CORRECTION

PATENT NO.    : 6,629,142 B1
DATED         : September 30, 2003
INVENTOR(S)   : Badami et al.

It is certified that error appears in the above-identified patent and that said Letters Patent is hereby corrected as shown below:

Column 11,
Line 60, replace "said-particular" with -- said particular --.

Signed and Sealed this

Twenty-fifth Day of November, 2003

JAMES E. ROGAN
*Director of the United States Patent and Trademark Office*